US012693955B2

(12) United States Patent
Vaissiere et al.

(10) Patent No.: US 12,693,955 B2
(45) Date of Patent: Jul. 28, 2026

(54) METHOD OF DETERMINING APPLICATION-SPECIFIC TOTAL PLAUSIBILITIES OF MEASURED VALUES OF AT LEAST ONE MEASURAND MEASURED BY A MEASUREMENT SYSTEM IN A SPECIFIC APPLICATION

(71) Applicant: Endress+Hauser Conducta GmbH+Co. KG, Gerlingen (DE)

(72) Inventors: Dimitri Vaissiere, Rixheim (FR); Julia Mildner, Gerlingen (DE); André Lemke, Schluchsee (DE); Lars Bondzio, Gross-Umstadt (DE); Achim Gahr, Goldbach (DE); Tobias Zubler, Laufenburg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 542 days.

(21) Appl. No.: 17/993,223

(22) Filed: Nov. 23, 2022

(65) Prior Publication Data

US 2023/0161679 A1    May 25, 2023

(30) Foreign Application Priority Data

Nov. 23, 2021    (DE) ...................... 10 2021 130 639.6

(51) Int. Cl.
*G06F 11/34* (2006.01)

(52) U.S. Cl.
CPC .............................. *G06F 11/3409* (2013.01)

(58) Field of Classification Search
CPC .............................. G01D 3/08; G06F 11/3409

USPC ......................................................... 702/189
See application file for complete search history.

(56) References Cited

U.S. PATENT DOCUMENTS

| | | | | |
|---|---|---|---|---|
| 8,155,909 | B2 * | 4/2012 | Schmitt | B60W 50/045 |
| | | | | 702/93 |
| 11,041,777 | B2 * | 6/2021 | Heinken | G01L 27/007 |
| 11,846,533 | B2 * | 12/2023 | Zhu | G01F 1/8427 |
| 2010/0121609 | A1 | 5/2010 | Gorinevsky | |

(Continued)

FOREIGN PATENT DOCUMENTS

| | | |
|---|---|---|
| CN | 102901529 A | 1/2013 |
| CN | 111077087 A | 4/2020 |
| CN | 111813644 A | 10/2020 |

(Continued)

*Primary Examiner* — John H Le
(74) *Attorney, Agent, or Firm* — Kelly J. Smith; Endress+Hauser (USA) Holding, Inc.

(57) ABSTRACT

A method of determining application-specific plausibilities of measured values of measurands measured by measurement devices in a specific application is disclosed, comprising the steps of: recording data including items of diagnostic information for the measurement devices and variable values of specified variables including each measurand; for each measurand determining a total plausibility of the current measured values of the measurand based on plausibility values determined based on plausibility criteria including a diagnostic criterium and an application-specific threshold criterium and based on reliability values indicative of a statistical reliability of current measured value(s) of the measurand; and providing the total plausibilities and/or a total plausibility index determined based on the total plausibilities.

15 Claims, 4 Drawing Sheets

(56)     References Cited

U.S. PATENT DOCUMENTS

2020/0363245  A1     11/2020  Vaissiere

FOREIGN PATENT DOCUMENTS

| | | | |
|----|------------|----|---------|
| CN | 111947688  | A  | 11/2020 |
| CN | 112200323  | A  | 1/2021  |
| DE | 102004052110 | A1 | 5/2006  |
| DE | 102008042969 | A1 | 4/2010  |
| DE | 102019118413 | A1 | 1/2021  |
| EP | 2226630    | B1 | 12/2011 |
| EP | 3739403    | A1 | 11/2020 |
| EP | 4002041    | A1 | 5/2022  |

* cited by examiner a) $\quad \mathbf{I}_{ij}$ b) $\quad \mathbf{V}_n$ c) $\quad \mathbf{C}_{ik}:=[C(I_{ij});\ C_i(m_i)]$ d) $\quad \mathbf{D}$ e)  f)  f1) $\quad \mathbf{R}_{in}$ f2) $\quad \mathbf{P}_{tot}(m_i):=\mathbf{P}_{tot}(\mathbf{PC}_{ik};\ \mathbf{R}_{in})$ g) $\quad \mathbf{PR}$

| pH | f1(pH) |
|---|---|
| < 6 | 0 % |
| [6; 7] | 25 % |
| [7; 7,5] | 50 % |
| [7,5; 9,5] | 100 % |
| [9,5; 10] | 50 % |
| [10; 11] | 25 % |
| > 11 | 0 % |

1

METHOD OF DETERMINING APPLICATION-SPECIFIC TOTAL PLAUSIBILITIES OF MEASURED VALUES OF AT LEAST ONE MEASURAND MEASURED BY A MEASUREMENT SYSTEM IN A SPECIFIC APPLICATION

CROSS-REFERENCE TO RELATED APPLICATION

The present application is related to and claims the priority benefit of German Patent Application No. 10 2021 130 639.6, filed on Nov. 23, 2021, the entire contents of which are incorporated herein by reference.

TECHNICAL FIELD

The present disclosure concerns a method of determining application-specific total plausibilities of measured values of at least one measurand measured by a measurement system installed in a specific application, wherein the measurement system includes at least one measurement device and each measurement device measures at least one of the at least one measurand(s).

BACKGROUND

Measurement systems including measurement devices measuring measurands of interest in a specific application are employed in a large variety of different applications including industrial applications, as well as laboratory applications.

Measured values of measurands measured by a measurement system installed in a specific application are often employed to monitor, to regulate and/or to control the measurands, an operation of a plant or facility, e. g. a production facility, and/or at least one step of a process, e. g. a production process, performed at the application. For example, in a chemical production process, concentrations of reactants used in the production process and/or the concentration of analytes contained in pre-products, intermediate products and/or educts produced by the process can be monitored and a sequence of process steps of the production process can be scheduled, regulated and/or controlled based on the measured values of the measurands. Further liquid analysis measurement systems measuring measurands, such as a pH-value, a concentration of free chlorine and/or a turbidity of a medium, are e. g. employed in swimming pools, as well as in drinking water supply networks and water purification plants to monitor, to regulate and/or to control the quality of the water.

Depending on the specific application, an efficiency and/or a productivity of a production process, a product quality of products produced, the safety of operation of facilities, industrial plants and/or laboratories and/or the quality of drinking water may by depend on the measurement accuracy of the measurement devices, as well as on proper execution of a process performed at the specific application and/or on faultless operation of the plant or facility. Thus, in most applications the measurement accuracy of the measurement devices as well as a compliancy of the measurands to application specific requirements are of high importance.

Due to an increasing complexity of technical processes and the increasing number of measurement devices employed to measure measurands of interest in a specific application, it becomes more and more difficult to evaluate, whether measured values provided by measurement systems are plausible or indicative of a problem. Even when all measured values occur within value ranges specified for the application, there is a risk, that the measured values may be impaired due to a problem associated to one of the measurement devices, e. g. due to a measurement error, and/or that the measurands may have been affected by a problem associated to the application, e. g. by a fault or impairment of a process performed at the application. Further, measured values may temporarily be impaired during cleanings or calibrations of the measurement devices, as well as during time periods when measurement devices are temporarily removed from the measurement site for a visual inspection. Thus, a further use of measured values that are affected by one of these problems, e. g. an employment of these measured values for monitoring, regulation and/or control purposes, may constitute a safety hazard, may result in a reduced product quality of a product produced at the application, and/or may result in a reduced process efficiency of a process performed at the application.

A probability of occurrence of problems associated to the measurement devices can be significantly reduced by pre-emptive measures such as regularly servicing the measurement devices and/or repeated verifications, calibrations and/or adjustments of the measurement devices. As another means, a condition of measurement devices or of individual components thereof can be monitored based on diagnosis parameters and/or measurement devices capable of performing a self-diagnosis can be employed. As an example, measurement devices offered by the Endress+Hauser Group comprising a Heartbeat function enabling the measurement device to monitor its performance and/or to provide a status indicator indicating the condition of the measurement device can be installed.

Further, EP 2 226 630 B 1 discloses a method of determining a condition indicator for a water analysis apparatus based on technical parameters of the apparatus. The technical parameters are measured by sensors, e. g. by a humidity sensor measuring a humidity inside a housing of the apparatus and a sensor measuring a level of a reagent contained in a reservoir. For each technical parameter, a deviation between the measured parameter value and a corresponding reference value is determined. Following this, a deviation relevance value is determined for each deviation based on a parameter-specific deviation relevance function for the respective technical parameter. Finally, by means of an indicator function the condition indicator indicating the condition of the water analysis apparatus is calculated based on the deviation relevance values. This method provides the advantage, that the relevance of each deviation with respect to the overall condition of the entire apparatus is accounted for. One of the disadvantages of this method is, that the apparatus must be equipped with the means for measuring the technical parameters in addition to the analysis measurement devices required to perform the water analysis, and that impairments of the analysis measurement devices, as well as impairments of the water analysis measurement results determined by the apparatus, that are not related to the technical parameters indicative of the technical condition of the apparatus may remain unnoticed.

Even when all measurement devices operate properly problems may occur at a specific application e. g. due to a faulty performance of a process performed in the application and/or a faulty operation of a plant or facility. As an example, a correctly measured high concentration of free chlorine in drinking water may be an indicator that an excessive amount of chlorine has been added.

In this context, DE 10 2008 042 969 A1 describes a method of detecting process states in alternating production processes performed with sensors measuring sensor values representative of the process states, wherein the sensor values and/or process variables are simultaneously evaluated and a diagnosis of the process states and/or the sensor states is performed based on threshold ranges predetermined for the sensor values measured during the individual process states. This method provides the advantage, that the current process state is determinable based on the simultaneous evaluation and that problems caused by defective sensors and/or faulty performances of a process performed at the application will be detected based on deviations of the measured values from the threshold ranges predefined for the individual process states. The use of this method is however limited to applications, where sufficiently distinct predefined process states occur. Thus, it is unsuitable for applications, where the measurands change in an unknown and/or continuous manner such that sufficiently distinct process states cannot be identified.

SUMMARY

It is an object of the present disclosure to provide a method of determining application-specific plausibilities of measured values of measurands measured by a measurement system that can be applied in a wider range of applications and provides a plausibility result that truly accounts for potential impairments that may occur due to problems associated to the measurement devices, as well as due to problems associated to the application.

This object is achieved by a method of determining application-specific plausibilities of measured values of at least one measurand measured by a measurement system installed in a specific application; wherein the measurement system includes at least one measurement device and each measurement device measures at least one of the at least one measurands, the method comprising the steps of: for each measurand identifying at least one item of diagnostic information that is indicative of a condition of the measurement device measuring the respective measurand, specifying a number of at least one variable measured at or determined for the application such, that the specified variable(s) are given by or include each of the at least one measurand(s); for each measurand determining plausibility criteria for determining plausibility values including: at least one diagnostic criterium for determining a plausibility value indicative of the plausibility of measured values of the respective measurand based on at least one item value of at least one of the items of diagnostic information indicative of the condition of the measurement device measuring the respective measurand, and at least one threshold criterium for determining a plausibility value indicative of the plausibility of the measured values of the respective measurand based on their size in relation to at least one application-specific threshold range applicable to the measured values of the respective measurand, recording data including at least one item value of each item of diagnostic information and time series of variable values of each specified variable and their time of determination or measurement.

Based on the recorded data at least once or repeatedly performing the steps of: for each measurand: determining the plausibility values based on the plausibility criteria that have been determined for the respective measurand, determining at least one plausibility measure indicative of a reliability of one or more current measured values of the respective measurand measured during a limited current time interval in view of measured values of at least one or all specified variables that have been measured before the current time interval and are given by or include the measured values of the respective measurand, and determining a total plausibility of the current measured values of the respective measurand based on the plausibility measure(s) and the plausibility values that have been determined for the respective measurand; and providing a plausibility result including at least one of: the total plausibilities and a total plausibility index determined based the total plausibilities.

The method provides the advantage that each total plausibility is indicative of the plausibility of the measured values of the respective measurand in view of the condition of the measurement device measuring the measurand and in view of application specific requirements accounted for by the plausibility values and the plausibility measure(s). Other advantages are that the method can be performed solely based on data that is available at the specific application and that it can also be performed in applications where sufficiently distinct process states are unavailable.

In certain embodiments for at least one or each measurand, the plausibility measure(s) include at least one of: a first plausibility measure corresponding to a degree of compliancy of the current measured value(s) or a distribution of the current measured values of the respective measurand to a distribution or one of the distributions exhibited by measured values of the respective measurand measured before the current time interval, and a second plausibility measure corresponding to a degree of compliancy of the current measured value(s) of the respective measurand to an analysis result determined by a multivariate analysis of variable values of at least two analysis variables determined before the current time interval; wherein the analysis variables are given by the respective measurand and at least one or each other variable included in the selected variables.

In certain embodiments at least one or each total plausibility is determined: as a function of, as or based on a sum, a weighted sum, a product, or a weighted product of the plausibility measure(s) and the plausibility values determined for the respective measurand, or as a function of, as or based on a sum, a weighted sum, a product, or a weighted product of a minimum plausibility given by the smallest one of the plausibility values determined for the respective measurand and the plausibility measure(s) determined for the respective measurand, or determined by: subdividing the plausibility values into operational plausibility values including the plausibility values determined based the diagnostic criteria and application-specific plausibility values including the plausibility values determined based on the threshold criteria, and determining the total plausibility for the respective measurand as a function of or as or based on a sum, a weighted sum, a product, or a weighted product of each one of the plausibility measure(s) and the application-specific plausibility values determined for the respective measurand and a minimum plausibility given by the smallest one of the operational plausibility values determined for the respective measurand.

In another embodiment, the method comprises at least one of the steps of: a) displaying the plausibility result on a display in form of dashboard including an icon visualizing the total plausibility index and/or a given number of icons each visualizing one of the total plausibility values; wherein a fraction of an icon area of each icon corresponding to a size of the visualized total plausibility index or the visualized total plausibility values is filled in and the icon or the filled in fraction thereof is displayed in a color selected according to the size; b) providing the plausibility result in form of an e-mail or a message dispatched to a predetermined recipient and/or to at least one of: a predetermined device, a computer, a mobile device, a cell phone, a tablet, and a service tool; and c) providing the plausibility result to a superordinate unit configured to regulate and/or to control a process performed at the application and configured to perform an action of stopping or modifying at least one process step of a process performed at the application and/or at least one other predetermined action when the plausibility result fulfills a condition specified for the respective action.

In a further embodiment, the specified variables include at least one of: at least one process parameter measured by one of the measurement devices of the measurement system, at least one process parameter measured by a measurement instrument installed at the specific application; and at least one diagnostic parameter determined by or for one of the measurement devices.

In another embodiment, for at least one of the measurement devices the at least one item of diagnostic information indicative of the condition of the respective measurement device includes at least one of: an age of the measurement device, an operating time the measurement device, service times when the measurement device is serviced, verification times when a measurement accuracy of the measurement device is verified, a verification result attained by a verification of the measurement accuracy of the measurement device, calibration times when the measurement device is calibrated, a calibration result attained by a calibration of the measurement device, at least one diagnosis parameter determined by the measurement device, a status indicator determined based on a self-diagnosis performed by the measurement device, and an exposure-index corresponding to an exposure of the measurement device to adverse measurement conditions.

In another embodiment, the method is a method, wherein:

a) for at least one measurands of the plausibility criteria determined for the respective measurand include at least one of: a threshold criterium for determining a plausibility value based on whether the current measured value(s) of the respective measurand occur within an application-specific threshold-range not to be exceeded by this measurand, a threshold criterium for determining a plausibility value indicative of the plausibility of at least one current measured value of the respective measurands based on application-specific probabilities of occurrence of measured values of this measurand within application-specific threshold ranges, and a criterium for determining a plausibility value indicative of the plausibility of at least one current measured value of the respective measurand based on at least one current variable value of at least one or of two other variable(s), wherein each other variable is given by one of the other measurands or by a parameter included in the specified variables, and/or wherein:

b) for at least one of the measurands the plausibility measures include at least one of: a plausibility measure determined based on a method of detecting outliers included in the measured values of the respective measurand, a plausibility measure determined based on measured values of the respective measurand measured before the time(s) of measurement of the at least one current measured value of the respective measurand, a plausibility measure determined based on a combination of a probability of occurrence of measured values of the size of the at least one current measured value(s) of the respective measurand at the specific application and their probability of occurrence according to an empirical distribution determined based on measured value(s) of the respective measurand measured during a limited time interval preceding the time(s) of measurement of the current measured value(s); and a plausibility measure determined based on a deviation between the at least one current measured value of the respective measurand and corresponding predicted values predicted based on measured values of the respective measurand measured before the time(s) of measurement of the current measured value(s), wherein the predicted values are either determined based on autoregressive integrated moving average model that is fitted to the time series of the previously determined measured values, or determined based on a model for the measured values of the respective measurand that has been determined by a method of machine learning based on the data, or determined by another method of time series prediction.

In certain embodiments, for each plausibility criterium the corresponding plausibility value is determined based on a lookup-table or plausibility function associated to the respective plausibility criterium that assigns the plausibility values to the current measured values of the respective measurand based on or as a function of at least one property given by or determinable based on at least one of the item values of the item of diagnostic information and/or at least one of the variable values of at least one of the specified variables included in the data.

In a further embodiment, for at least one of the measurands the determined plausibility measures include a plausibility measure determined by: sorting measured values of the respective measurand measured during a preceding time interval according to their size along a line, subdividing the line into four quartiles, each including a quarter of the measured values, and determining the plausibility measure based on a plausibility function assigning the plausibility measure current measured value(s) of the respective measurand according to the quartile in which they occur to all current measured value(s) occurring at a position within predetermined first ranges of the line and/or according to a probability of occurrence of measured values of the size of current measured value(s) to all current measured value(s) occurring at a position within predetermined second ranges of the line; wherein the probability of occurrence of measured values of the sizes included in the second ranges is determined based on training data included in the data or based on the measured values that were measured during the preceding time interval.

In certain embodiments, the method is a method, wherein: for at least one of the measurands the determined plausibility measures include a plausibility measure determined based on a plausibility function assigning the plausibility measure to the at least one current measured value of the respective measurand as a function of or as or based on a sum, a weighted sum, a product, or a weighted product of a first plausibility determined based on a first plausibility function and a second plausibility determined based on a second plausibility function; wherein: the first plausibility function assigns the first plausibility to the current measured value(s) according to a probability of occurrence of measured values of the size of the current measured value(s) at the specific application; wherein the first plausibility function is either determined based on estimates of the likelihood of occurrence of measured values of given sizes at the specific application or based on a frequency of occurrence of measured values of different sizes determined based on measured values that have been measured during a training time interval covering a time span of sufficiently long duration to cover all modes of operation and/or each of the processes performed at the specific application; wherein the second plausibility function assigns the second plausibility to the at least one current measured value based on their probability of occurrence according to an empirical distribution determined based on measured value(s) measured during a limited time interval preceding the time of measurement of the current measured value(s); and the second plausibility function is either determined as or based on a frequency of occurrence of measured values of different sizes determined based on the measured values that have been measured during the limited time interval or as a probability function representing the probability of occurrence of measured values of the respective measurand as a function of their size determined based on a kernel density estimation.

In certain embodiments, the method further comprises the steps of for at least one of the measurands: identifying at least one knock-out criterium for the plausibility of the measured values of the respective measurand; and performing the determination of the total plausibility of the measured values of the respective measurand such, that the total plausibility is either set to zero or reduced to an extent accounting for an impact of the fulfillment of the respective knock-out criterium on the plausibility of the measured values of the respective measurand when the respective knock-out criterium is fulfilled; wherein the knock-out criteria identified for the respective measurand include at least one of: a knock-out criterium related to one of the items of diagnostic information identified for the measurement device measuring this measurand, a knock-out criterium requiring for a status indicator determined for the measurement device measuring this measurand to indicate that the measurement device is defect, a knock-out criterium requiring for the measured values of this measurand and/or the variable values of at least one other variable included in the specified variables to exceed a maximum tolerable range or to exceed or drop below a given threshold, and a knock-out criterium related to at least one parameter included in the specified variables, that is measured or determined by one of the measurement devices or by a measurement instrument installed at the specific application.

In certain embodiments, the method is a method wherein the measurement system is an analysis system, wherein the measurement devices measure measurands of a medium flowing through a flow chamber, wherein the specified variables include a flow of the medium flowing through the flow chamber and wherein: the plausibility criteria include at least one criterium for determining the plausibility value of measured values of one of the measurands based on the measured flow, and/or the total plausibility of the measured values of at least one or each of the at least one measurand is set to zero when the flow through the flow cell drops below an absolute minimum flow rate required to measure the respective measurand.

In certain embodiments, the method further comprises a method step of performing an iterative process of optimizing this method by based on labeled training data obtained by an expert operator evaluating and classifying previously determined total plausibilities performing a method of machine learning configured to optimize the determination of the total plausibility and/or to optimize at least one of: the application-specific thresholds, the application-specific threshold ranges, the lookup tables and functions employed to determine the plausibility values and the plausibility measures employed to determine the total plausibilities.

In certain embodiments, the method is a computer implemented method, wherein: each plausibility result is determined and provided by computing means configured to determine and to provide the plausibility result based on the recorded data and based on a computer program implemented on the computing means and causing the computing means to perform the determination; and the computing means is included in the measurement system, is included in or connected to a transmitter connected to the measurement devices, is included in a device, an edge device or a superordinate unit located in the vicinity of the measurement system and connected to or communicating with the measurement devices, or is embodied in the cloud.

The object is further achieved by a computer program comprising instructions which, when the program is executed by a computer, cause the computer to carry out the method described herein based on the data provided to the computer, as well as by computer program product comprising this computer program and at least one computer readable medium, wherein at least the computer program is stored on the computer readable medium.

BRIEF DESCRIPTION OF THE DRAWINGS

The present disclosure and further advantages are explained in more detail below based on the example shown in the figures of the drawing, wherein.

DETAILED DESCRIPTION

The present disclosure concerns a method of determining application-specific plausibilities of measured values mvi of at least one measurand mi measured by a measurement system installed in a specific application.

The method can be applied with respect to any measurement system known in the art, that is installed in a specific application and configured to measure at least one measurand mi. To this extent, the measurement system includes at least one measurement device Mi and each measurement device Mi measures at least one measurand mi. With respect to the measurement devices Mi devices known in the art and configured to measure at least one measurand mi of interest in the specific application, e. g. a process parameter related to a process performed at the measurement site and/or a property of a medium produced, processed and/or monitored at the measurement site, can be employed. Examples of measurands mi include a level, a pressure, a temperature, a density, a conductivity, a flow, a pH-value, a turbidity, a spectral absorption of a medium, a concentration of an analyte comprised in the medium and/or at least one other measurand mi. As an example, an oxygen content, an ammonium content and/or a phosphor content may be measured. Regardless of the measurand(s) mi measured by the measurement device(s) Mi, each measurement device Mi is either embodied as a simple device, e. g. as a sensor or probe, solely measuring a single measurand mi or as a more complex device measuring at least two measurand(s) mi and/or at least one measurand mi and at least one parameter, e. g. a diagnostic parameter and/or a process parameter. Examples of applications include industrial applications, e. g. production plants, chemical plants, water purification plants, as well as laboratory applications. Further examples include measurement systems performing measurements in a natural environment, as well as measurement systems applied in medical diagnostics, e. g. systems performing in-situ, in-vitro or in-vivo measurements. Regardless of the application, the measured values mvi provided by the measurement system are e. g. employed to monitor, to regulate and/or to control a process performed at the application, e.g. on or by the plant or facility, to monitor, to regulate and/or to control at least one property or the quality of a medium, e. g. a medium given by a pre-product, an intermediate product or an end-product processed and/or produced at the application, and/or to monitor, to regulate and/or to control an efficiency of a process performed at the application.

Figure 1:
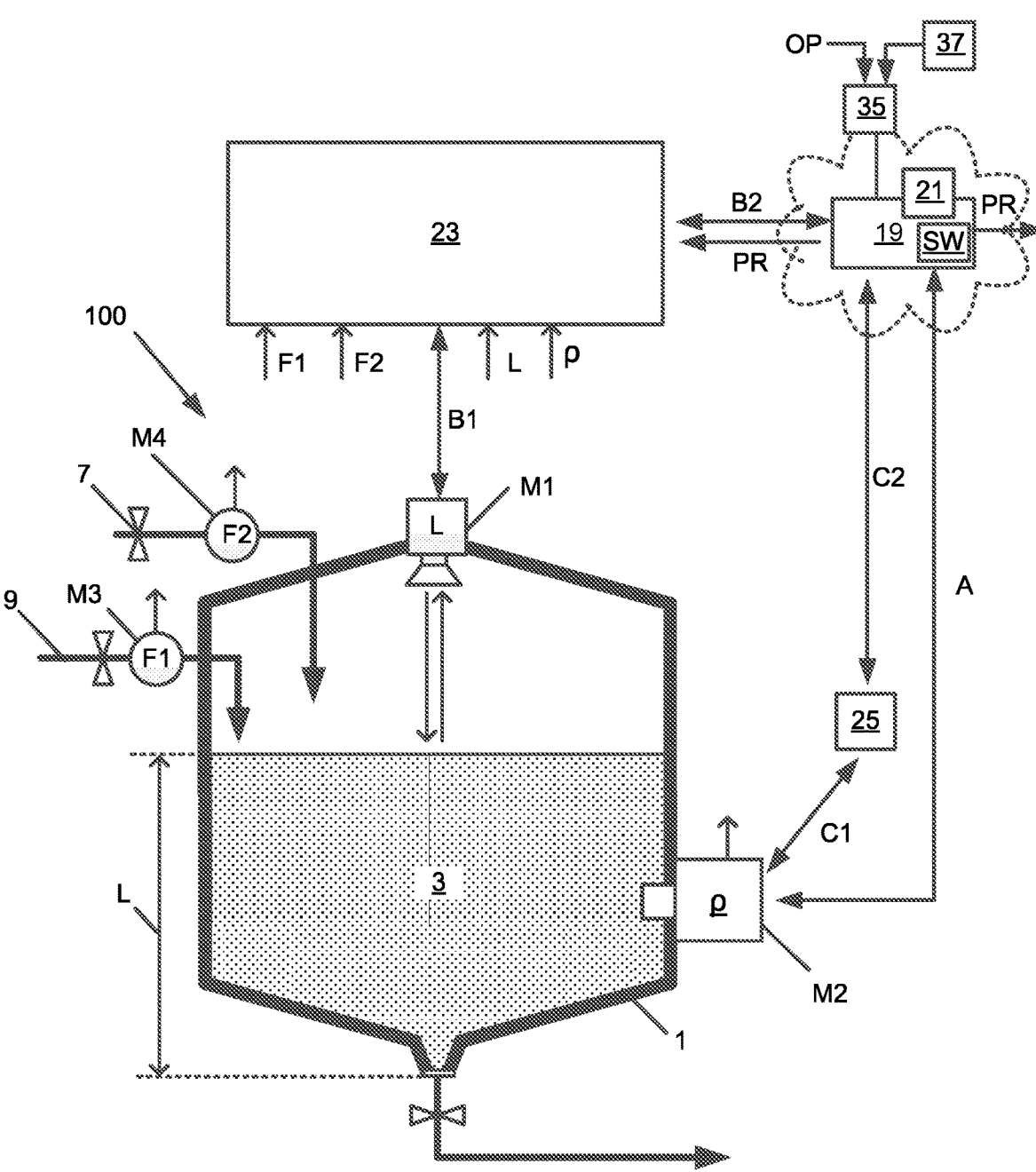
FIG. 1 shows: a measurement system installed on a container in a specific application.

FIG. 1 shows an example of a measurement system 100 installed on a container 1 in a specific application, e. g. an application where a process, e. g. a production process performed in the container 1, is monitored, regulated and/or controlled based on the measured values mvi provided by the measurement system 100. The exemplary measurement devices Mi shown include a level measurement device M1 measuring a level L of a medium 3 contained in the container 1, a conductivity sensor M2 measuring a conductivity $\rho$ of the medium 3 and two flow meters M3, M4 each measuring a flow F1, F2 of an additive flowing into the container 1.

Figure 2:
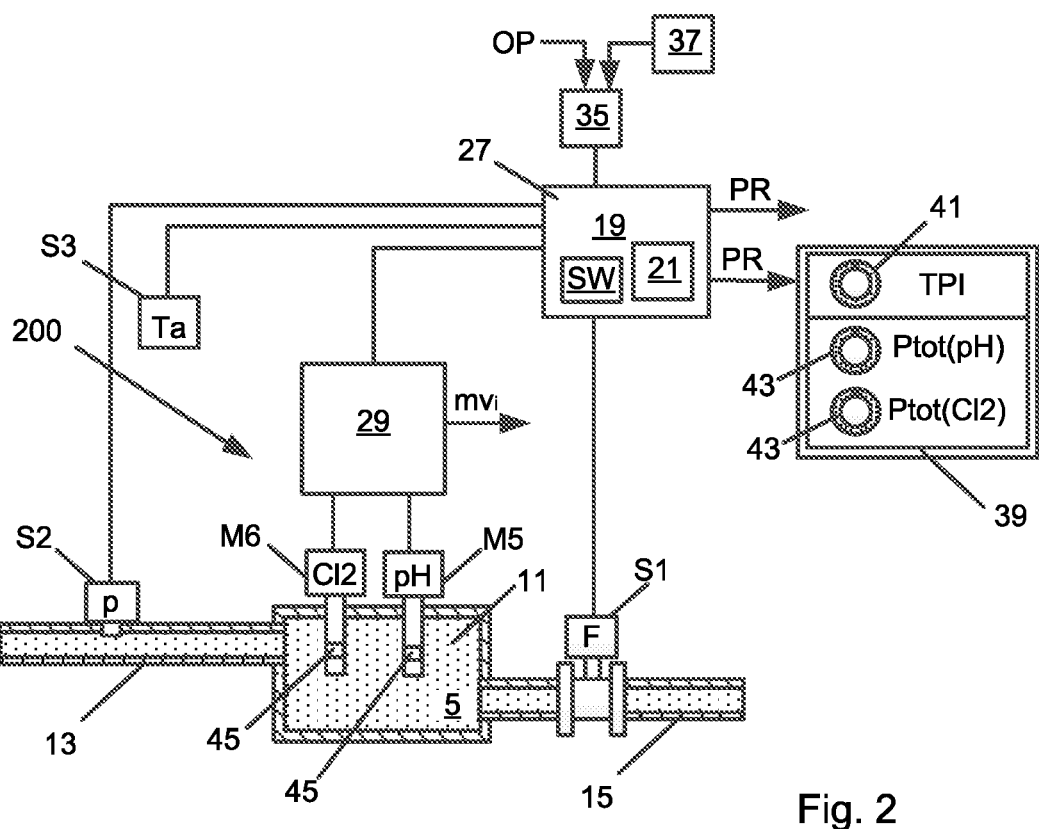
FIG. 2 shows: an analysis measurement system installed on a pipe in a specific application.

FIG. 2 shows a further example, wherein the measurement system 200 is an analysis system, e. g. a liquid analysis system, including measurement devices Mi measuring measurands mi of a medium 5. To give an example of a specific application, the measurement system shown in FIG. 2 is e.g. employed as a water quality measurement system installed at a measurement site located along a water pipe or a by-pass transporting water, e. g. fresh water to be supplied to a swimming pool or water extracted from the swimming pool. In the example shown, the measurement devices Mi include a pH-sensor M5 measuring a pH-value pH of the medium 5 and a chlorine sensor M6 measuring a concentration of free chlorine Cl2 contained in the medium 5.

Figure 3:
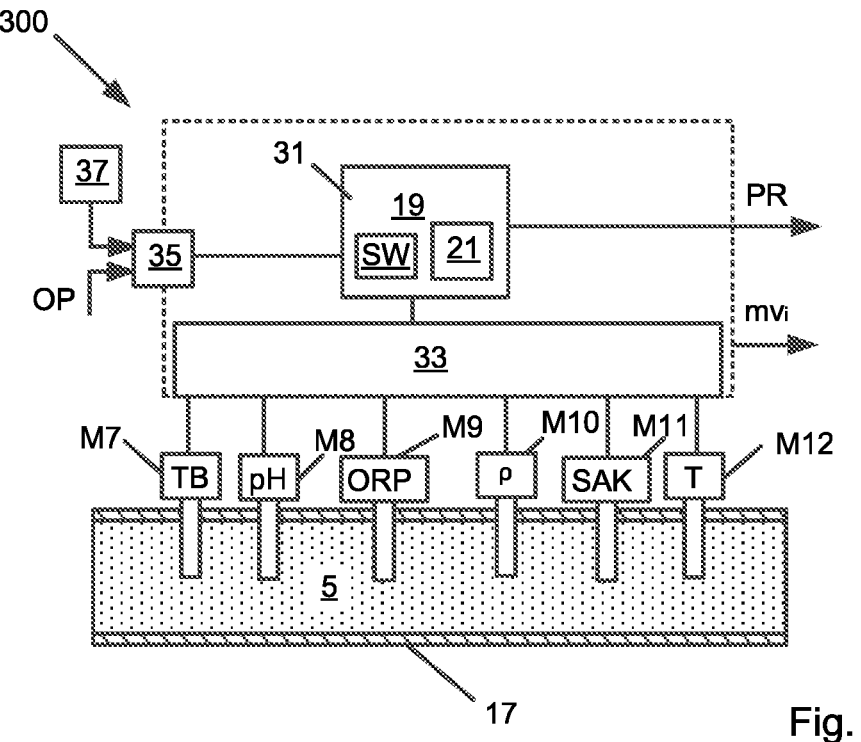
FIG. 3 shows: an analysis measurement system installed at a measurement site.

FIG. 3 shows another example, wherein the measurement system 300 is e. g. embodied as a water quality measurement system employed for monitoring the quality of drinking water in a specific application, e. g. at a measurement site in a drinking water supply network, where the measurement system 300 is installed. In this case, the measurement devices Mi e. g. include a turbidity sensor M7 measuring a turbidity TB, a pH-sensor M8 measuring a pH-value pH, an oxidation reduction potential sensor M9 measuring an oxidation reduction potential ORP, a conductivity sensor M10 measuring a conductivity p, a spectral absorption sensor M11 measuring a spectral absorption SAK, and/or a temperature sensor M12 measuring a temperature T of the medium 5.

Various ways of installing the measurement system 100, 200, 300 and/or the individual measurement devices Mi known in the art can be applied. In FIG. 1, each measurement device M1, M2, M3, M4 is mounted individually at a different position, e. g. on an inlet pipe 7, 9 connected to an inlet of the container 1, above the container 1 or on a container wall of the container 1. In FIG. 2 the measurement devices M5, M6 are embodied as immersion probes mounted on a flow chamber 11 such, that they are immersed in the medium 5 flowing through the flow chamber 11 that is supplied to the flow chamber 11 via an inlet tube 13 and exiting the flow chamber 11 via an outlet tube 15. In FIG. 3 each measurement device M7, M8, M9, M10, M11, M12 is mounted individually at a different position along a vessel 17, e. g. an open channel, a pipe or a container containing the medium 5.

Figures 4, 5, 6:
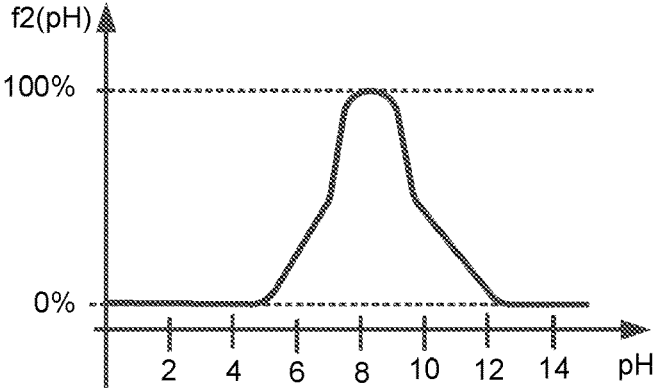
FIG. 4 shows: method steps of the method disclosed herein.
FIG. 5 shows: a discrete plausibility function.
FIG. 6 shows: a continuous plausibility function.

As illustrated in FIG. 4, the method of determining application specific plausibilities of the measured values mvi includes a method step a) of for each measurand mi identifying at least one item of diagnostic information Iij that is indicative of a condition of the measurement device Mi measuring the respective measurand mi.

The item(s) of diagnostic information Iij available, measured or determined for the respective measurement device Mi e. g. include: an age of the measurement device Mi, an operating time of the measurement device Mi, service times when the measurement device Mi is serviced, verification times when a measurement accuracy of the measurement device Mi is verified, e. g. based on reference measurements, a verification result attained by a verification of the measurement accuracy of the measurement device Mi, calibration times when the measurement device Mi is calibrated and/or a calibration result attained by a calibration of the measurement device Mi.

With respect to measurement devices Mi configured to determine at least one diagnosis parameter indicative of the condition of the respective measurement device Mi the items of diagnostic information Iij e. g. include a diagnosis parameter determined and provided by the measurement device Mi. As an example, at least one of the pH-sensors M5, M8 may be configured to determine and to provide a diagnosis parameter given by an electrical impedance of its ion-selective glass membrane which is indicative of the condition of the membrane.

With respect to measurement devices Mi configured to perform a self-diagnosis, the items of diagnostic information Iij e. g. include a status indicator representing the condition of the measurement device Mi that is determined and provided by the measurement device Mi based on the self-diagnosis performed by the measurement device Mi.

As another example, the items of diagnostic information Iij may include an exposure index corresponding to an exposure of the measurement device Mi to adverse measurement conditions. The exposure index is e. g. determined based on an exposure time, during which the measurement device Mi was exposed to adverse conditions, e. g. to temperatures exceeding a temperature range specified for the measurement device Mi and/or to pressures exceeding a pressure range specified for the measurement device Mi, and/or based on an exposure time during which the measurand mi exceeded a measurement range of the measurement device Mi.

The method further includes a method step b) of specifying a number of at least one variable(s) vn measured at or determined for the application such, that the specified variable(s) vn are either given by or include each one of the measurand(s) mi measured by the measurement system 100, 200, 300. In the first case, the number of specified variable(s) vn is equal to the number of measurand(s) mi. In the latter case, the specified variables vn include each measurand mi and at least one parameter measured at or determined for the application. Depending on the application, the parameter(s) included in the specified variable(s) vn e g. include at least one process parameter measured by one of the measurement devices Mi of the measurement system 100, 200, 300 and/or at least one process parameter measured by another measurement instrument Sm installed at the specific application in addition to the measurement system 100, 200, 300. Examples of process parameters are illustrated in FIG. 2, where the pH-sensor M5 and the chlorine-sensor M6 are each configured to measure a process parameter, e. g. a temperature Tph measured by a temperature-sensor 45 included in the pH-sensor M5 and a temperature Tcl2 measured by the temperature sensor 45 included in the chlorine sensor M6.

As an alternative option, at least one or each of the process parameters measured by the measurement device(s) Mi is e. g. included in the specified variables vn as one of the measurands mi measured by the measurement system 100, 200, 300.

In many applications at least one measurement instrument Sm measuring a process parameter, e. g. a property of the medium 5 and/or a process parameter associated to a process performed at the application, is installed in addition to the measurement system 100, 200, 300. Exemplary measurement instruments Sm including a flow meter S1 measuring a flow F of the medium 5 flowing through the flow chamber 11, a pressure sensor S2 measuring a pressure p inside the supply pipe 13 and a temperature sensor S3 measuring an ambient temperature Ta are shown in FIG. 2.

In the example shown in FIG. 2, the specified variables vn include the measurands mi given by the pH-value pH and the chlorine content Cl of the medium 5 and may include at least one or all of the parameters available, e. g. the temperature Tph, the temperature Tcl2, the flow F, the pressure p inside the supply pipe 13 and/or the ambient temperature Ta.

In addition, or as an alternative to the process parameters measured by the measurement devices Mi and/or the measurement instruments Sm, the parameters included in the specified variables vn may include at least one diagnostic parameter measured by or determined for one of the measurement devices Mi.

The method further includes a method step c) of for each measurand mi determining plausibility criteria Cik for determining corresponding plausibility values PCik indicative of the plausibility of the measured values mvi of the respective measurand mi.

For each measurand mi, the plausibility criteria Cik include at least one diagnostic criterium C(Iij) for determining a plausibility value P(Iij) indicative of a plausibility of the measured values mvi of the respective measurand mi based on at least one item value of at least one of the items of diagnostic information Iij indicative of the condition of the measurement device Mi measuring the respective measurand mi.

For each measurand mi, the plausibility criteria Cik further include at least one threshold criterium Cj(mi) for determining a plausibility value Pj(mi) indicative of the plausibility of the measured values mvi of the respective measurand mi based on their size in relation to at least one application-specific threshold range applicable to the measured values mvi of the respective measurand mvi. As an example, the threshold criteria Cj(mi) e. g. include at least one criterium Cl(mi) for determining a plausibility value P1(*mi*) indicative of a plausibility of at least one current measured value mvi(tr) of one of the measurands mi based on an application-specific threshold-range for the respective measurand mi that should not be exceeded in the specific application. As an example, a pH-value of drinking water may e. g. always be required to be larger or equal to 6 and smaller or equal to 8. In addition, or as an alternative, the threshold criteria Cj(mi) e. g. include a criterium C2(*mi*) for determining a plausibility value P2(*mi*) indicative of the plausibility of at least one current measured value mvi (tr) of one of the measurands mi based on application specific probabilities of occurrence of measured values mvi of the respective measurand mi within application specific threshold ranges. As an example, in a specific application the probability of occurrence of measured pH-values pH of the medium 5 within a center range of 6 to 8 may be significantly higher than their probability of occurrence within side ranges of 4 to 6 and of 8 to 10, and the application specific probability of occurrence of measured pH-values pH below 4 and above 10 may be negligible or zero.

The method further includes a method step d) of recording data D including at least one item value of each item of diagnostic information Iij and time series of variable values mvn of each specified variable vn and their time t of determination or measurement and a method step of based on the recorded data D at least once or repeatedly performing a method step e) including a method step f) of for each measurand mi determining a total plausibility Ptot(mi) of the current measured values mvi(tr) of the respective measurand mi and a method step g) of providing a corresponding plausibility result PR.

The method disclosed herein is preferably performed as a computer implemented method. In that case, the method steps of the method, in particular each determination of the plausibility result PR, is performed by computing means 19 by means of a computer program SW. Thus, the present disclosure is also realized in form of a computer program SW comprising instructions which, when the program is executed by a computer, cause the computer to carry out the method disclosed herein. In addition, the present disclosure further comprises a computer program product comprising the computer program SW described above and at least one computer readable medium, wherein at least the computer program SW is stored on the computer readable medium.

When the method is performed as a computer implemented method, the data D is e. g. transferred to and at least temporarily stored in a memory 21 associated to the computing means 19. The computing means 19 is e. g. embodied as a unit including hardware, e. g. a computer or a computing system, included in the measurement system 300 or located in the vicinity of the measurement system 200, e. g. in an edge device or a superordinate unit. As an alternative option cloud computing can be applied. Cloud computing denominates an approach, wherein IT-infrastructure, like hardware, computing power, memory, network capacity and/or software are provided via a network, e. g. via the internet. In that case, the computing means 19 is embodied in the cloud. In either case, the measured values mvi are directly or indirectly provided to the computing means 19 or the memory 21 associated to the computing means 19. To this extent hard wired or wireless connections and/or communication protocols known in the art, like e. g. LAN, W-LAN, Fieldbus, Profibus, Hart, Bluetooth, Near Field Communication, TCP/IP etc. can be applied. As an option, application programming interfaces (REST-API) conforming to an architectural style known in the art as representational state transfer (REST) may be employed.

When the computing means 19 is embodied in the cloud, e. g. as shown in FIG. 1, software including algorithms, the recorded data D and administration are e. g. hosted in a web-based database. This provides the advantage, that neither the measurement system 100, nor a superordinate unit 23 and/or an edge device 25 that may be connected to and/or communicating with the measurement devices Mi requires access to the recorded data D. In FIG. 1, each measurement device Mi is e. g. connected to and/or communicating with the computing means 19 directly as illustrated by the arrow A, via the superordinate unit 23, e. g. a programmable logical controller, as illustrate by the arrows B1 and B2, and/or via the edge device 25 located in the vicinity of the measurement devices Mi as indicated by the arrows C1, C2. As an example, at least one or each of the measurement devices Mi, the edge device 25 and/or the superordinate unit 23 may be directly or indirectly connected to the computing means 19 via the Internet, e. g. via a communication network, like e. g. TCP/IP.

In FIG. 2, the computing means 19 is included in a device 27 located in the vicinity of the measurement system 200. Here, the device 27 is e. g. given by an edge device or a superordinate unit or another device that is directly or indirectly connected to and/or communicating with each measurement device Mi. In this embodiment, software including algorithms, as well as the recorded data D is hosted in the device 27 and the administration as well as the total plausibilities Ptot(mi) are either hosted in the device 27 or in a web-based database. This embodiment provides the advantage, that it can be implemented at comparably low cost because it requires less data traffic than cloud-based implementations and minimizes data usage in the cloud. Implementing the computing means 19 in the vicinity of the measurement system 200 is particularly suitable for applications where interruptions of connectivity to the web-based data base are likely to occur.

Regardless of whether the computing means 19 is embodied in the cloud or in the vicinity of the measurement system 100, 200 the measurement devices Mi are e. g. configured to provide the measured values mvi and their time of measurement t, e. g. as shown in FIG. 1. As an alternative shown in FIG. 2 the measurement devices Mi are e. g. connected to a transmitter 29 configured to determine and to provide the measured values mvi and their time of measurement t based on measurement signals provided by the individual measurement devices Mi. In this case the transmitter 29 is e. g. connected to and/or communicating with the computing means 19 directly as shown in FIG. 2 or via a superordinate unit and/or via an edge device located in the vicinity of the transmitter 29.

In FIG. 3 the computing means 19 and the memory 21 are included in a component 31 of the measurement system 300. In this case, the component 31 may e. g. be connected to or communicating with the measurement devices Mi providing the measured values mvi and their time of measurement t. As an alternative, shown in FIG. 3, the component 31 is e. g. included in or connected to a transmitter 33 connected to the measurement devices Mi and configured to determine and to provide the measured values mvi and their time of measurement t based on measurement signals provided by the individual measurement devices Mi. When the computing means 19 is implemented in the measurement system 300, software, the data D and administration are implemented in the measurement system 300. This requires for the measurement system 300 to be equipped with advanced data analysis functions and sufficient calculation power. Thus, implementing the computing means 19 in the measurement system 300 is particularly suitable for highly critical applications or remote application where no connectivity to the internet is available.

Regardless of where the computing means 19 is implemented, the item values of the items of diagnostic information Iij may e. g. be provided to the computing means 19 and/or the memory 21 by one or more sources. As an example, at least one item value or a time series of item values of at least one of the items of diagnostic information Iij is e. g. determined and provided by one of the measurement devices Mi, by the transmitter 29, 33, by the edge device 25 or the superordinate unit 23 directly or indirectly connected to or communication with the computing means 19. In addition, or as an alternative at least one item value or a time series of item values of at least one of the items of diagnostic information Iij is e. g. provided to the computing means 19 via an interface 35, e. g. an interface including a user interface enabling an operator to provide item values as indicated by the arrow OP and/or or an interface connected to or communicating with an external data source 37, e. g. a data base, providing item values.

Measured values mvn of specified variables vn given by parameters determined by the measurement devices Mi are e. g. provided to the computing means 19 in the same way as the measured values mvi of the measurand(s) mi measured by the respective measurement device Mi. Measured values mvn of specified variables vn given by parameters measured by the measurement instruments Sm are e. g. provided to the computing means 19 by the respective measurement instrument Sm being connected to and/or communicating with the computing means 19 directly, via a superordinate unit 23, and/or via an edge device 25 located in the vicinity of the respective measurement instrument Sm.

As mentioned above, each determination of the plausibility result PR includes step f) of determining the total plausibility Ptot(mi) for each measurand mi. Each of these total plausibilities Ptot(mi) is determined by determining the plausibility values PCik based on the plausibility criteria Cik that have been determined for the respective measurand mi and by performing a method step f1) determining at least one plausibility measure Rin indicative of a reliability of one or more current measured value(s) mvi(tr) of the respective measurand mi that have been measured during a limited current time interval in view of measured values mvn of at least one or all specified variables vn that have been measured before the current time interval and are given by or include the measured values mvi of the respective measurand mi. As an option, each plausibility measure Rin is e. g. determined as a value, preferably as a normalized value larger or equal to 0 and smaller or equal to 1 or in form of a corresponding percentage larger or equal to 0% and smaller or equal to 100%.

For each measurand mi the plausibility measure(s) Rin preferably include a first plausibility measure Ri1 and/or a second plausibility measure Ri2. Each first plausibility measure Ri1 is determined by performing an analysis of the measured values mvi of the respective measurand mi and by determining the first plausibility measure Ri1 corresponding to a degree of compliancy of the current measured value(s) mvi(tr) or a distribution of the current measured values mvi(tr) of the respective measurand mi that have been measured during the limited current time interval to a distribution or one of the distributions exhibited by measured values mvi of the respective measurand mi that have been measured before the current time interval. As an example, the first plausibility measures Ri1 are e. g. given by a statistical probability of the determined current measured value(s) mvi(tr) to constitute a sample of the distribution or one of the distributions exhibited by the measured values mvi that have been measured before the current time interval.

Each second plausibility measure Ri2 is determined by performing a multivariate analysis of predetermined analysis variables. These analysis variables are either given by all specified variables vn or by a selection of the specified variables vn including the respective measurand mi. Based on the multivariate analysis the second plausibility measure Ri2 is then determined as a plausibility measure Ri2 corresponding to a degree of compliancy of the current measured value(s) mvi(tr) of the respective measurand mi that have been measured during a limited current time interval to an analysis result determined by the multivariate analysis based on the variable values of the analysis variables that have been measured before the current time interval.

With respect to the multivariate analysis MVA known mathematical method of analyzing data sets, such as time series of a given number of analysis variables, based on the principles of multivariate statistics can by employed. These methods enable the determination of interrelationships between the data sets, e. g. structural relationships, correlations and/or interdependencies between the analysis variables and/or structural relationships, correlations and/or interdependencies between patterns and/or distributions exhibited by the values of the analysis variables. In context of the method disclosed herein the multivariate data analysis is e. g. employed to determine application specific interrelationships between the analyzed variables and to determine each second plausibility measure Ri2 according the degree of compliancy of the current measured value(s) mvi(tr) of the respective measurand mi to the interrelationships, that have been determined based on the variable values of the analysis variables included in the data D, that have been determined before the time(s) of measurement tr of the current measured values mvi(tr).

The analysis variables include the respective measurand mi and preferably also all other measurands mi≠i measured by the measurement system 100, 200, 300. In most applications at least one of the parameters, e. g. the ambient temperature Ta, the pressure p, the flow F and/or the temperature Tcl, TpH measured by the pH-sensor M5 and/or the chlorine-sensor M6 shown in FIG. 2, have an influence on at least one of the measurands mi and/or on the measured values mvi of the respective measurand mi. In consequence, by the analysis variables additionally including at least one of the parameters included in the specific variables vn the capabilities of the multivariate analysis to differentiate between current measured values mvi(tr) of the measurand mi determined with properly operating measurement devices Mi during proper execution of processes performed at the specific application, and current measured values mvi(tr) affected by a problem associated to at least one of the measurement devices Mi and the application is further improved.

The determination of the total plausibilities Ptot(mi) further includes a method step f2) of for each measurand mi determining the total plausibility Ptot(mi) of the current measured values mvi(tr) of the respective measurand mi based on the plausibility measure(s) Rin and the plausibility values PCik, that have been determined for the respective measurand mi.

For each plausibility criterium Cik the corresponding plausibility value PCik is e. g. determined based on a lookup-table or plausibility function f(Cik) associated to the respective plausibility criterium Cik that assigns the plausibility values PCik to the current measured values mvi(tr) of the respective measurand mi based on or as a function of at least one property given by or determinable based on at least one of the item values of the item of diagnostic information Iij and/or the variable values mvn of at least one of the specified variables vn included in the data D.

Just like the plausibility measures Rin, the plausibility values PCik are e. g. determined as normalized plausibility values larger or equal to 0 and smaller or equal to 1 or in form of a corresponding percentage larger or equal to 0% and smaller or equal to 100%.

As an example, for at least one or each diagnostic criterium C(Iij) the corresponding plausibility value PIij is e. g. each determined based on a lookup table or a plausibility function f(Iij) representing the plausibility of the measured values mvi as a function of at least one property given by or determinable based on the item value(s) of the respective item(s) of diagnostic information Iij. As an example, regarding the age of one of the measurement devices Mi, a look-up table including predetermined individual plausibility values for different age groups, e. g. a high value applicable when the measurement device Mi is new, an intermediate value applicable when the measurement device Mi is of an intermediate age, and a low value applicable when the measurement device Mi is reaching an end of its lifetime, may be employed. In addition, or as an alternative a plausibility function given by a reliability function representing the reliability of measured values determined by measurement devices of the type of the respective measurement device Mi as a function of their age may be employed. In this case the plausibility value is given by the reliability value provided by the reliability function for measurement devices of the age of the respective measurement device Mi. Regarding the item(s) of diagnostic information Iij given by the calibration times, the corresponding plausibility values are e. g. determined based on a continuous plausibility function of the time elapsed since the measurement device Mi has last been calibrated. This plausibility function is e. g. defined such, that the plausibility value provided by this function decrease as the time elapsed since the last calibration of the measurement device Mi increases.

Regarding threshold criteria C1(*mi*) defined based on application-specific threshold-range that the respective measurand mi should not exceed in the specific application, the corresponding plausibility value P1(*mi*) is e g. determined based on a lookup table providing a plausibility value of 0% when the current measured value(s) mvi(tr) of the respective measurand mi exceed(s) the application specific threshold range and providing a plausibility value of 100% when the current measured value(s) mvi (tr) occur within this threshold range.

Regarding threshold criteria C2(*mi*), defined based on application specific probabilities of occurrence of measured values mvi of the respective measurand mi within different threshold ranges the corresponding plausibility value P2(*mi*) is e g. determined based on a lookup table or a plausibility function. FIG. 5 shows an example of a look-up table assigning plausibility values f1(pH) to measured pH-values pH according to the one of the threshold ranges listed in the left column in which they occur, and FIG. 6 shows an example of a plausibility function f2 representing the plausibility value f2(pH) as function of the size of the measured pH-value pH.

For each measurand mi the total plausibility Ptot(mi) is determined based on the plausibility measure(s) Rin and the plausibility values PCik that have been determined for the respective measurand mi. According to a first embodiment, each total plausibility Ptot(mi) is determined based on all plausibility measure(s) Rin and all plausibility values PCik determined for the respective measurand mi. As an example, at least one or each of the total plausibilities Ptot(mi) is determined as a function of or as or based on a sum or a weighted sum of the plausibility measure(s) Ri1 and the plausibility values PCik; e. g. as:

$$Ptot(m_i) :=$$

$$Ptot(Rin, Cik) = \frac{1}{\left(\sum_{k=1}^{l} w_{i,k} + \sum_{n=1}^{m} w_{i,n}\right)}\left(\sum_{k=1}^{l} PCik \cdot w_{i,k} + \sum_{n=1}^{m} Rin \cdot w_{i,n}\right)$$

or as or based on a product or a weighted product of the plausibility measure(s) Rin and the plausibility values PCik, e. g. as $$Ptot(m_i) := Ptot(Rin; Cik) = \sqrt[(l+m)]{\left(\prod_{k=1}^{l} PCik \prod_{n=1}^{m} Rin\right)}$$

In case a weighted sum or a weighted product is employed, each of the plausibility measure(s) Rin and the plausibility values PCik is multiplied with a weighing factor wi,k; wi,n accounting for the impact of the respective value on the total plausibility Ptot(mi) of the measured values mvi of the respective measurand mi. The employment of correct weighing factors wi,n, wi,k provides the advantage of a very high accuracy of the total plausibilities Ptot(mi). To this extent, the weighing factor wi,n for each plausibility measure Rin is e. g. determined to correspond to the accuracy of the respective plausibility measure(s) Rin. These accuracies are e. g. determined by performing a mathematical method of determining the reliability of the respective plausibility measure Rin based on the method applied to determine the respective plausibility measure Rin and the statistical properties of the data D employed to determine the respective plausibility measure Rin. Whereas the determination of the weighing factors wi,n for the plausibility measure(s) Rin can be performed entirely data driven, the determination of the weighing factors $w_{i,k}$ for the plausibility values PCik regularly requires expert knowledge about the measurement devices Mi and the application. Thus, the determination of the weighing factors $w_{i,k}$ for the plausibility values PCik may be a tedious time consuming process, and the accuracy of these weighing factors $w_{i,k}$ is only as good as the expert knowledge available. As an alternative, identical weighing factors $w_{i,k}$ can be employed for each of the plausibility values PCik. In this case, differences of the relevance of the individual plausibility values PCik with respect to the total plausibility $Ptot(m_i)$ of the measured values $mv_i$ of the respective measurand mi is no longer accounted for.

According to a second embodiment, at least one or each total plausibility Ptot(mi) is determined based on each one of the plausibility measure(s) Rin determined for the respective measurand mi and a minimum plausibility Pmin1 given by the smallest one of the plausibility values PCik determined for the respective measurand mi. In this case the respective total plausibility Ptot(mi):=Ptot(PCik; Rin):=Ptot(Pmin1; Rin) is e. g. determined as a function the minimum plausibility Pmin1 and each one the plausibility measure(s) Rin determined for the respective measurand mi. This constitutes a more conservative approach, which increases the safety by eliminating the risk, that a potentially critical value of one of the plausibility values PCik does not result in a correspondingly low total plausibility Ptot(mi) because its impact was erroneously underestimated Like in the first embodiment, the respective total plausibility Ptot(mi) is e. g.

determined as a function of or as or based on a sum, a weighted sum, a product, or a weighted product of the minimum plausibility Pmin1 and the plausibility measure(s) Rin. As an alternative, an even more conservative approach may be applied, e. g. by determining the respective total plausibility Ptot(mi) as or based on a product of the minimum plausibility Pmin1 and a term Rtot1, e. g. by Ptot(mi): =Pmin1*Rtot1, wherein the term Rtot1 is determined as a function of or as or based on a sum, a weighted sum, a product, or a weighted product of all plausibility measure(s) Rin that have been determined for the respective measurand mi.

According to a third embodiment, the plausibility values PCik may be subdivided into operational plausibility values including the plausibility values P(Iij) determined based the diagnostic criteria C(Iij) and application-specific plausibility values including the plausibility values Pj(mi) determined based on the threshold criteria Cj(mi). In this case, at least one or each total plausibility Ptot(mi) determined for one of the measurands mi is e. g. determined based on as a function of or as or based on a sum, a weighted sum, a product, or a weighted product of each one of the plausibility measure(s) Rin determined for the respective measurand mi, each one of the application-specific plausibility values determined for the respective measurand mi and a minimum plausibility Pmin2 given by the smallest one of the operational plausibility values determined for the respective measurand mi. As an example, the respective total plausibility Ptot(mi) is e. g. determined as or based on a product of the minimum plausibility Pmin2 and a term Rtot2, e. g. by Ptot(mi): =Pmin2*Rtot2, wherein the term Rtot2 is determined as a function of or as or based on a sum, a weighted sum, a product, or a weighted product of all application-specific plausibility values and all plausibility measures Rin that have been determined for the respective measurand mi.

Following the determination of the total plausibility Ptot (mi) of the measured values mvi for each measurand mi in method step g) a corresponding plausibility result PR including the total plausibilities Ptot(mi) and/or a total plausibility index TPI determined based on the total plausibilities Ptot (mi) of the measured values mvi of all measurands mi is provided.

In certain embodiments providing the plausibility result PR is performed by displaying the plausibility result PR on a display 39 accessible to an operator at the specific application. One approach is to utilize visualization tools like dashboards for providing the information in an intuitively readable graphical form. As an example, graphs, diagrams, or geometrical forms indicating the size of the total plausibilities Ptot(mi) and/or the total plausibility index TPI can be applied. As an additional option, the displayed information may be color coded. To this extent, intuitively understandable color schemes, such as using a red color to visualize a low plausibility and a green color to visualize a high plausibility may be employed. This provides the advantage, that it enables a fast recognition and an intuitive understanding of all displayed information. An example is shown in FIG. 2 where the plausibility result PR determined for the measurement system 200 shown in FIG. 2 is displayed on the display 39 in form of dashboard showing an icon 41 displaying the total plausibility index TPI and a number of icons 43 each displaying the total plausibility Ptot(mi) determined for one of the measurands mi. Each icon 41, 43 has a given shape, e. g. the shape of a ring or doughnut. Further, a fraction of an icon area of each icon 41, 43 corresponding to the size of the total plausibility index TPI or the total plausibility Ptot(mi) visualized by the respective icon 41, 43 is filled in and each icon 41, 43 or the filled in fraction thereof is preferably displayed in a color selected according to the size of the total plausibility index TPI or the total plausibility Ptot(mi) displayed by the respective icon 41, 43. As an example, the entire ring-shaped icon 41 displaying the total plausibility index TPI may e. g. be filled in and the icon 41 or the filled in fraction thereof may be colored in green when the total plausibility index TPI is 100% and only half of the ring may be filled and the icon 41 or the filled in fraction thereof may be displayed in red, when the total plausibility index TPI is only 50%.

In addition, or as an alternative, the plausibility result PR is e. g. be provided in form of an e-mail or a message automatically generated by the computing means 19 and dispatched to a predetermined recipient and/or a predetermined device, e. g. a computer or a mobile device, e. g. a cell phone, a tablet, or a service tool.

In addition, or as an alternative, the plausibility result PR is e. g. provided to a superordinate unit, e. g. the superordinate unit 23 shown in FIG. 1, configured to regulate and/or to control a process performed at the application in a manner accounting for the plausibility result PR. As an example, the superordinate unit 23 may be configured to perform at least one predefined action when the plausibility result PR fulfils a condition specified for the respective action. The predefined actions may include changing or stopping at least one process step of a process performed at the application. As an example, an entire process may be stopped by the superordinate unit 23 when the total plausibility index TPI and/or the total plausibility Ptot(mi) determined for the or each measurand mi specified in the condition drops below a corresponding predetermined threshold. Further, the performance of at least one process step may by modified when the total plausibility index TPI and/or the total plausibility Ptot(mi) determined for the or each measurand mi specified in the condition drops below a corresponding predetermined threshold.

The present disclosure provides the advantages mentioned above. Individual steps of the method can be implemented in different ways without deviating from the scope of the present disclosure. Several optional embodiments are described in more detail below.

In certain embodiments, the plausibility criteria Cik include at least one plausibility criterium C3(*mi*) for determining a corresponding plausibility values P3(*mi*) indicative of the plausibility of the measured values mvi of the respective measurand mi in view of at least one other variable vj, wherein each other variable vj is given by one of the other measurands mj≠i or one of the parameters included in the specified variables vn. In this case, the corresponding plausibility values P3(*mi*) are determined as described above based on at least one current measured value mvj(tr) of each other variable vj specified in the respective criterium C3(*mi*) and are subsequently employed in the determination of the total plausibility Ptot(mi) for the respective measurand mi in the same way as the previously described plausibility values PCik. When the total plausibilities Ptot(mi) are determined according to the third embodiment, the operational plausibility values additionally include each of the plausibility values P3(*mi*) indicative of the plausibility of the measured values mvi of the respective measurand mi in view of at least one other variable vj, that has been determined for the respective measurand mi.

As an example, a threshold criterium related to the temperature TpH measured by the pH-sensor M5 is e. g. determined for the pH value pH measured by the pH-sensor M5 shown in FIG. 2 based on a temperature range specified for this pH-sensor M5. In this case, the corresponding plausibility value is e. g. determined based on a lookup table or a plausibility function indicating a high plausibility when the measured temperature Tph occurs within the specified temperature range and indicating a low plausibility when the measured temperature Tph exceeds this temperature range.

As another example, a plausibility value is e. g. determined for the pH-value measured by the pH-sensor M5 and/or the chlorine concentration Cl2 measured by the chlorine-sensor M6 shown in FIG. 2 based on a threshold criterium related to a temperature difference between the temperature TpH measured by the pH-sensor M5 and the temperature Tcl measured by the chlorine sensor M6. Each of these plausibility values is e. g. determined based on a lookup table or a plausibility function providing a high plausibility value of the measured values mvi of the respective measurand mi when the temperature difference occurs within an application-specific threshold range predetermined for the temperature difference and indicating a low plausibility when the temperature difference exceeds the application-specific threshold range.

Further, an additional plausibility value is e. g. determined for the pH-value measured by the pH-sensor M5 and/or for the chlorine concentration Cl2 measured by the chlorine-sensor M6 shown in FIG. 2 based on a threshold criterium related to the flow F of the medium 5 flowing through the flow chamber 11. Each of these plausibility values is e. g. determined based on a lookup table or a plausibility function providing a high plausibility value when the flow F exceeds an application-specific flow rate and providing a low plausibility value when the flow F drops below the application-specific flow rate. Here, the application-specific flow rate is e. g. a minimum flow rate required to ensure, that the measurements performed by the measurement system 200 are always performed on fresh samples of the medium 5 routed through the flow cell 11 and thus are indicative of the present condition of the medium 5, e. g. the present water quality in the swimming pool, to be monitored based on the measurements performed on the samples routed through the flow cell 11.

In addition, or as an alternative, in certain embodiments the method includes for at least one of the measurands mi determining at least one further plausibility measure Rin indicative of the reliability of at least one current measured value mvi(tr) of the respective measurand mi that has been measured during a current time interval based on measured values mvi of this measurand mi that have been measured before the current time interval. As an example, these plausibility measures Rin e. g. include a plausibility measure determined based on a method of outlier detection, a plausibility measure determined based on at least one time series prediction for the measured values mvi of the respective measurand mi and/or a plausibility measure determined based on a probability of occurrence of, a distribution of or a pattern described by the measured values mvi of the respective measurand mi.

Figure 7:
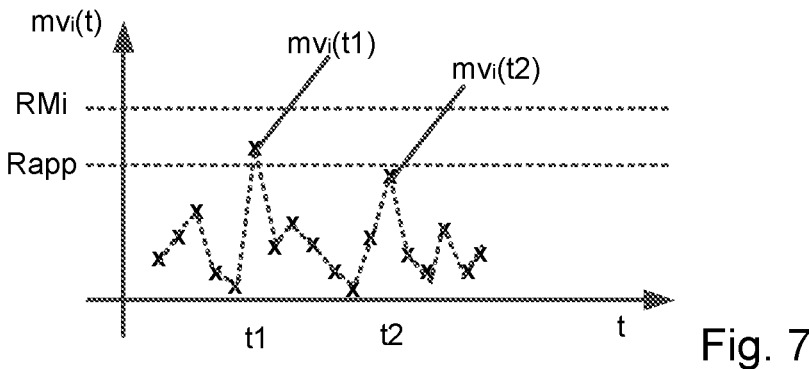
FIG. 7 shows: a time series of measured values of a measurand.

This is illustrated in FIG. 7 showing a time series of measured values mvi of one of the measurands mi measured by one of the measurement devices Mi, as well as a device-specific threshold RMi given by the measurement range of the measurement device Mi and an application specific threshold Rapp not to be exceeded by the measurand mi in this application. As shown, none of the measured values mvi exceed the device-specific threshold RMi and only the measured value mvi(t1) measured at the time t1 appears to be unreliable because it exceeds the application-specific threshold Rapp. Even though the measured value mvi(t2) measured at the time t2 occurs within the application-specific threshold Rapp it may nonetheless be unreliable, e. g. because it is identified as an outlier detected by a method of outlier detection performed based on the previously determined measured values mvi and/or or because it significantly deviates from a corresponding predicted value.

As an example, a method of outlier detection evaluating current measured value(s) mvi(tr) based on an analysis of measured values mvi measured during a preceding time interval can be employed to determine a corresponding plausibility measure Ri3. In this case, a length of the preceding time interval is preferably predetermined such, that the measured values mvi measured during the preceding time interval are representative of a statistical distribution of the measured values mvi to be expected in the specific application. As an example, illustrated in FIG. 8, the analysis may include sorting the measured values mvi measured during the preceding time interval according to their size along a line illustrated by a double pointed arrow in FIG. 8. The thus determined line is then subdivided into four quartiles Q1:=[q0; q1], Q2:=[q1; q2], Q3:=[q2; q3], Q4:=[q3; q4], each including a quarter of the measured values mvi. Thus, a lower limit q0 of the quartile value range [q0; q1] of the first quartile Q1 corresponds to the size of the smallest measured value mvi, an upper limit q4 of the quartile value range [q3; q4] of the fourth quartile Q4 corresponds to the size of the largest measured values mvi and a limit q2 separating the two intermediate quartiles Q2 and Q3 corresponds to a median of the measured values mvi measured during the preceding time interval.

Based on this method of outlier detection, the corresponding plausibility measure is e. g. determined according to a position q of at least one current measured value mvi(tr) along the line based on a plausibility function f(q) assigning the plausibility measure to the current measured value(s) mvi(tr) according to their position q along the line. As an example, the plausibility function e. g. assigns the plausibility measure to current measured values mvi(tr) according to the quartile Q1, Q2, Q3, Q4 in which they occur to all current measured values mvi(tr) occurring in predetermined first ranges of the line and/or according to a probability of occurrence of measured values mvi of the size of current measured value(s) mvi(tr) to all current measured value(s) mvi(tr) occurring in predetermined second ranges of the line. The probability of occurrence of measured values mvi of the sizes included in the second ranges is e. g. determined based on training data included in the data D or based on the measured values mvi measured during the preceding time interval.

As an example, the plausibility function may e. g. assign the same plausibility measure to all current measured value(s) mvi(tr) occurring in the same one of the quartiles Q1, Q2, Q3, Q4. In this case, the first ranges include the quartile ranges [q0; q1], [q1; q2], [q2; q3], [q3; q4] of all four quartiles Q1, Q2, Q3, Q4. As an alternative, the plausibility function may e. g. assign the plausibility measure according to a probability of occurrence of measured values mvi of the size of the current measured value(s) mvi(tr) to all current measured value(s) mvi(tr) occurring along the line. In this case, the second ranges include the quartile ranges [q0; q1], [q1; q2], [q2; q3], [q3; q4] of all four quartiles Q1, Q2, Q3, Q4.

Figure 8:
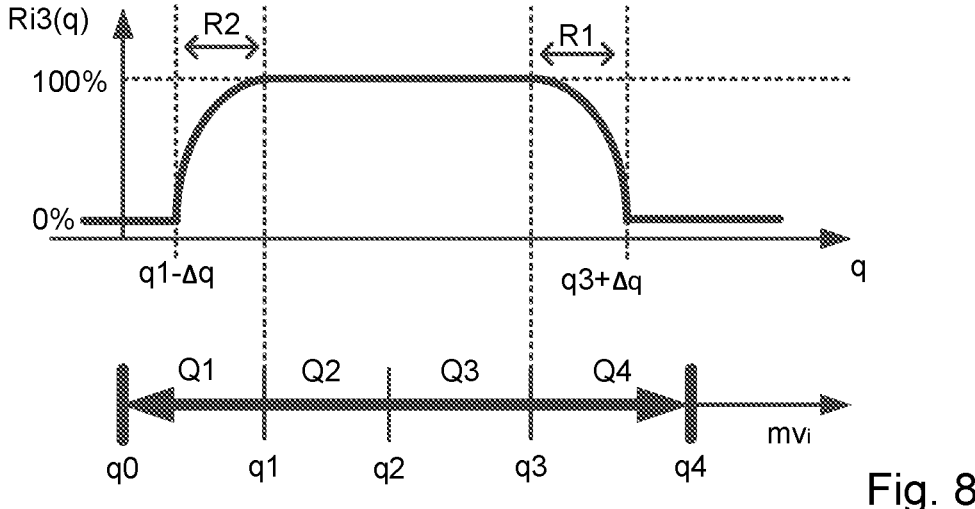
FIG. 8 shows: a line spanned by measured values sorted according to their size and a plausibility function.

As another example a combination of first and second ranges may be applied. An example of a corresponding plausibility function Ri3(q) is shown in FIG. 8 above the line of measured values mvi. This plausibility function Ri3(q) assigns a plausibility measure of 100% to current measured values mvi(tr) occurring within the two intermediate quartiles Q2 and Q3 and it assigns plausibility measures corresponding to the probability of occurrence of measured values mvi of the size of the current measured value(s) mvi(tr) to all current measured values mvi(tr) occurring in a first intermediate range R1:=[q3; q3+$\Delta$q] of positions q exceeding the upper limit q3 of the third quartile Q3 by less than a predetermined additive +$\Delta$q, and to all current measured values mvi(tr) occurring in a second intermediate range R2:=[q1-$\Delta$q; q1] of positions q subsiding the lower limit q1 of the second quartile Q2 by less than a predetermined subtrahend −$\Delta$q. The plausibility function Ri3(q) shown in FIG. 8 further assigns a plausibility measure of 0% to all current measured values mvi(tr) exceeding the upper limit q3+ $\Delta$q of the first intermediate range R1 and to all current measured values mvi(tr) occurring at a position q below the lower limit q1-$\Delta$q of the second intermediate range R2. Thus, in this example the first ranges include the quartile ranges [q1; q2], [q2; q3] of the two intermediate quartiles Q2 and Q3, the range exceeding the upper limit q3+ $\Delta$q of the first intermediate range R1 and the range subseeding the lower limit q1-$\Delta$q of the second intermediate range R2 and the second ranges includes the two intermediate ranges R1, R2.

In applications, where the measured values mvi of at least one of the measurands mi are normally distributed an average and a standard deviation of the measured values mvi of the respective mi can be determined. In this case, the plausibility measures Rin e. g. include at least one plausibility measure Ri4 determined based on a deviation between at least one current measured value mvi(tr) of the respective measurand mi and the average. These plausibility measures Ri4 are e. g. determined based on a plausibility function assigning plausibility measures to the current measured value(s) mvi(tr) according to their position within the normal distribution. In analogy to the previous example, in this case a plausibility measure Ri4 of 100% is e. g. assigned to current measured value(s) mvi(tr) occurring within one standard deviation of the average and plausibility measures Ri4 corresponding to the probability of occurrence of measured values mvi of the size of the current measured values mvi(tr) according to the normal distribution are e. g. assigned to current measured value(s) mvi(tr) deviating from the average by more than one standard deviation.

As another example, the determination of the plausibility measures Rin e. g. includes for at least one of the measurands mi determining a plausibility measure Ri5 based on the size of the current measured value(s) mvi(tr) and a combination of an application-specific probability of occurrence of measured values mvi of the size of the current measured value(s) mvi(tr) and their probability of occurrence according to an empirical distribution determined based on measured values mvi that have been measured during a limited time interval preceding the time(s) of measurement tr of the current measured value(s) mvi(tr). Here, the limited time interval is e. g. implemented in form of a sliding window of a given width, that extends up to the time of measurement tr of the current measured value(s) mvi(tr). In this case, the corresponding plausibility measure Ri5 is e. g. determined based on a plausibility function assigning the plausibility measure to the current measured value(s) mvi(tr) as a function of or as or based on a sum, a weighted sum, a product, or a weighted product of a first plausibility fa(mvi(tr)) determined based on a first plausibility function fa and a second plausibility first plausibility fb(mvi(tr)) determined based on a second plausibility function fb.

The first plausibility function fa assigns the first plausibility fa(mvi(tr)) to the current measured value(s) mvi(tr) according to the probability of occurrence of measured values mvi of the size of the current measured value(s) mvi(tr) at the specific application. A quick and easy approach is to determine the first plausibility function fa based on estimates of the likelihood of occurrence of measured values mvi of given sizes at the specific application. As an alternative, the first plausibility function fa is e. g. determined based on a frequency of occurrence of measured values mvi of different sizes determined based on measured values mvi that have been measured during a training time interval covering a time span of sufficiently long duration to cover all modes of operation and/or each of the processes performed at the specific application.

The second plausibility function fb assigns the second plausibility fb(mvi(tr)) to the current measured value(s) mvi(tr) according to their probability of occurrence according to the empirical distribution. The second plausibility function fb is e. g. determined as or based on a frequency of occurrence of measured values mvi of different sizes determined based on the measured values mvi that have been measured during the limited time interval.

As an alternative, the second plausibility function fb is determined in a significantly more precise manner by performing a kernel density estimation KDE. To this extent, kernel density estimation methods developed in statistics to determine a probability distribution of a random variable based on a sample of a statistical population may be employed. In this case, a probability function representing the probability of occurrence of measured values mvi as a function of their size is determined based on the kernel density estimation KDE and the second plausibility function fb is determined as or based on this probability function.

Figure 9:
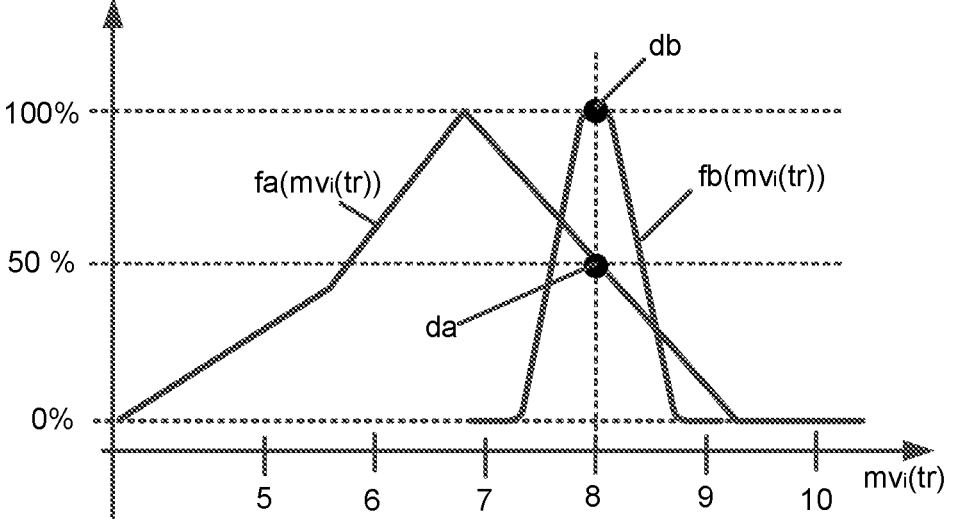
FIG. 9 shows: a first plausibility function and a second plausibility function.

An example of the first and the second plausibility function fa, fb is shown in FIG. 9. Just like the plausibility function f2(pH) shown in FIG. 6, the first plausibility function fa represents the plausibility of current measured values mvi(tr) as a function of their size according to their probability of occurrence within application-specific threshold ranges and the second plausibility function fb assigns the second plausibility fb(mvi(tr)) to current measured value(s) mvi(tr) according to their probability of occurrence according to the empirical distribution. As indicated by the dots da, db shown in FIG. 9, for a current measured value mvi(tr), e. g. a pH-value of 8, the first plausibility function fa may only render a first plausibility of 50%, whereas the second plausibility function fb renders a second plausibility of 100%. Thus, by determining the plausibility measure Ri5 based on both, the first plausibility fa(mvi(tr)) and the second plausibility fb(mvi(tr)), the higher level of confidence in the current measured value mvi(tr) justified by the compliancy to the empirical distribution is accounted for.

As another example, in certain embodiments, the determination of the plausibility measures Rin includes determining at least one plausibility measure Ri6 based on a deviation between current measured values mvi(tr) of the respective measurand mi and corresponding predicted values predicted based on measured values mvi that have been measured before the time of measurement tr of the current measured value(s) mvi(tr). The predicted values are e. g. determined based on a method of time series prediction. In this case, the corresponding plausibility measure Ri6 is e. g. determined based on a plausibility function assigning plausibility measures to the current measured value(s) mvi(tr) according to a size of the deviation. As an example, the time series prediction is e. g. performed based on an autoregressive integrated moving average model (ARIMA model) that is fitted to the time series of the previously determined measured values mvi and then employed to forecast future points of the time series. In addition, or as an alternative Kalman filters or a method of machine learning may be employed to determine a model for the measured values mvi of the respective measurand mi based on the recorded data D. In this case, the predicted values are determined based on the thus determined model.

As an optional feature, the method includes for at least one of the measurands mi identifying at least one knock-out criterium KO for the plausibility of measured values mvi of the respective measurand mi. In this case, the total plausibility Ptot($m_i$) of the measured values my, of the respective measurand $m_1$ is determined such, that it is either set to zero or reduced to an extent accounting for an impact of the fulfillment of the respective knock-out criterium KO on the plausibility of the measured values $mv_i$ of the respective measurand $m_i$ when the respective knock-out criterium KO is fulfilled.

In certain embodiments, the knock-out criteria KO e. g. include a knock-out criterium related to at least one of the items of diagnostic information Iij identified for the measurement device Mi measuring the respective measurand mi, a knock-out criterium related to the measured values mvi of the measurand mi, and/or a knock-out criterium KO related to the variable values mvj of at least one variable vj included in the specified variables vn. As an example, the total plausibility Ptot(mi) of the measured values mvi of one of the measurands mi is e. g. determined to be zero when a knock-out criterium requiring for the status indicator provided by the measurement device Mi measuring this measurand mi to indicate that the measurement device Mi is defect, is fulfilled. Further, the total plausibility Ptot(mi) of the measured values mvi of one of the measurands mi is e. g. determined to be zero when a knock-out criterium requiring for the measured values mvi of the measurand mi to exceed a maximum tolerable range is fulfilled. With respect to the maximum tolerable range(s) application-specific maximum tolerable ranges as well as device-specific maximum tolerable ranges can be employed. As an example, the total plausibility Ptot(Cl2) of the chlorine concentration Cl2 measured by the chlorine sensor M6 shown in FIG. 2 measuring the chlorine concentration Cl2 of the swimming pool water is e. g. set to zero when the measured chlorine concentration Cl2 exceeds an application-specific maximum tolerable range that swimmers can be safely exposed to and/or when the measured chlorine concentration Cl2 exceeds the measurement range of the chlorine sensor M6. As another example, the pH-sensor M5 shown in FIG. 2 may e. g. be specified to be operated in a device-specific pressure range, e. g. because pressures exceeding this range may impair a permeability of its ion-selective membrane. In this case, the total plausibility Ptot(pH) of the pH-value(s) pH measured by the pH-sensor M5 is e. g. determined to be zero when a knock-out criterium requiring for the pressure p measured by the pressure sensors S2 to exceed the device-specific pressure range is fulfilled. Further, the total plausibility Ptot(Cl2) of the chlorine concentration Cl2 measured by the chlorine sensor M6 and/or the total plausibility Ptot(pH) of the pH-value(s) pH measured by the pH-sensor M5 shown in FIG. 2 is e. g. be determined to be zero, in case a knock-out criterium requiring for the flow F through the flow cell 11 measured by the flow meter S1 to drop below an absolute minimum flow rate required to perform the measurements of the pH-value pH and/or the measurements of the chlorine concentration Cl2 is fulfilled.

In certain embodiments, the capabilities of the method disclosed herein may be further improved by performing an iterative process of optimizing the determination of the total plausibilities Ptot(mi) by based on labeled training data obtained by an expert operator evaluating and classifying previously determined total plausibilities Ptot(mi) performing a method of machine learning configured to optimize the determination of the total plausibility Ptot(mi) and/or at least one of the application-specific thresholds and threshold ranges, the lookup tables and functions employed to determine the plausibility values PCik and the lookup tables and functions employed to determine the plausibility measures Rin employed in the determination of the total plausibilities Ptot(mi).

To this extent, previously determined total plausibilities Ptot(mi) are e. g. evaluated by the expert operator and classified as "false-negative" when the method incorrectly determined a low plausibility, as "false-positive" when the method incorrectly determined a high plausibility, as "true-negative" when the method correctly determined a low plausibility, and as "true-positive" when the method correctly determined a high plausibility. The labeled training data determined based on these classifications is then fed into a machine learning algorithm configured to optimize the determination of the total plausibility Ptot(mi), e. g. by adjusting at least one of: the application-specific thresholds and threshold ranges, and/or by replacing at least one of the lookup tables and functions employed to determine the plausibility values PCik and the plausibility measures Rin by a more detailed corrected and/or more precise version thereof.

The method disclosed herein may be started based on a rough estimate of the application-specific threshold ranges for the specified variables vn. As an example, an application specific temperature range for the temperature T of the medium 5 measured by the temperature sensor M12 shown in FIG. 3 may have initially been given by an estimated range of 10° C. to 15° C. It may however turn out, that the measured temperatures T are often lower than 10° C. This will lead to a correspondingly reduced total plausibility Ptot(T) for the temperature T measured by the temperature sensor M12 and may also influence the total plausibility Ptot(mi) of other measurands mi. In case the operator evaluating the total plausibilities Ptot(mi) determines that neither a problem associated to the measurement devices Mi nor a problem associated to the application is present, he will then classify them as "false-negative". Subsequently labeled training data determined based on these classifications is then employed to optimize the method, e. g. by performing a method of machine learning configured to determine at least one root cause of false positive and/or false negative determinations of the total plausibilities Ptot(m$_i$) and to amend the determination of the total plausibilities Ptot(m$_i$) accordingly. In the example given here, this will lead to an adjustment of the temperature range such that is covers temperatures below 10° C.

The invention claimed is:

1. A method of performing at least one of monitoring, regulating and controlling at least one of: a process performed at a specific application, at least one property or a quality of a medium prevailing at the specific application, and an efficiency of a process performed at the specific application based on measured values of at least one measurand measured at the specific application and application specific plausibility of the measured values, the method comprising:

installing a measurement system at the specific application; wherein the measurement system includes at least one measurement device,
with each measurement device measuring at least one of the at least one measurand and providing measured values of the respective measurand, and
determining the application specific plausibilities of the measured values by performing the method steps of:
for each measurand identifying at least one item of diagnostic information that is indicative of a condition of the measurement device measuring the respective measurand;
specifying a number of at least one variable measured at or determined for the application such that the specified variable(s) are given by or include each of the at least one measurand;
for each measurand determining plausibility criteria for determining plausibility values including:
at least one diagnostic criterium for determining a plausibility value indicative of the plausibility of measured values of the respective measurand based on at least one item value of at least one of the items of diagnostic information indicative of the condition of the measurement device measuring the respective measurand, and
at least one threshold criterium for determining a plausibility value indicative of the plausibility of the measured values of the respective measurand based on their size in relation to at least one application-specific threshold range applicable to the measured values of the respective measurand;
recording data including at least one item value of each item of diagnostic information and time series of variable values of each specified variable and their time of determination or measurement; and
based on the recorded data at least once or repeatedly performing the steps of:
for each measurand:
determining the plausibility values based on the plausibility criteria that have been determined for the respective measurand,
determining at least one plausibility measure indicative of a reliability of one or more current measured value(s) of the respective measurand measured during a limited current time interval in view of measured values of at least one or all specified variables that have been measured before the current time interval and are given by or include the measured values of the respective measurand,
and
determining a total plausibility of the current measured values of the respective measurand based on the plausibility measure(s) and the plausibility values that have been determined for the respective measurand, and
providing a plausibility result including at least one of: the total plausibilities and a total plausibility index determined based the total plausibilities;
performing the monitoring, regulating and/or controlling based on the measured values of the measurands and the total plausibility of the current measured values of each measurand.

2. The method according to claim 1, wherein for at least one or each measurand, the plausibility measure(s) include at least one of:
a first plausibility measure corresponding to a degree of compliancy of the current measured value(s) or a distribution of the current measured values of the respective measurand to a distribution or one of the distributions exhibited by measured values of the respective measurand measured before the current time interval, and a second plausibility measure corresponding to a degree of compliancy of the current measured value(s) of the respective measurand to an analysis result determined by a multivariate analysis of variable values of at least two analysis variables determined before the current time interval; wherein the analysis variables are given by the respective measurand and at least one or each other variable included in the selected variables.

3. The method according to claim 2, wherein at least one or each total plausibility is determined:

as a function of, as or based on a sum, a weighted sum, a product, or a weighted product of the plausibility measure(s) and the plausibility values determined for the respective measurand, or as a function of, as or based on a sum, a weighted sum, a product, or a weighted product of a minimum plausibility given by the smallest one of the plausibility values determined for the respective measurand and the plausibility measure(s) determined for the respective measurand, or determined by:

subdividing the plausibility values into operational plausibility values including the plausibility values determined based the diagnostic criteria and application-specific plausibility values including the plausibility values determined based on the threshold criteria, and determining the total plausibility for the respective measurand as a function of or as or based on a sum, a weighted sum, a product, or a weighted product of each one of the plausibility measure(s) and the application-specific plausibility values determined for the respective measurand and a minimum plausibility given by the smallest one of the operational plausibility values determined for the respective measurand.

4. The method according to claim 1, comprising at least one of the steps of:

a) displaying the plausibility result on a display in form of dashboard including an icon visualizing the total plausibility index and/or a given number of icons each visualizing one of the total plausibility values; wherein a fraction of an icon area of each icon corresponding to a size of the visualized total plausibility index or the visualized total plausibility values is filled in and the icon or the filled in fraction thereof is displayed in a color selected according to the size;

b) providing the plausibility result in form of an e-mail or a message dispatched to a predetermined recipient and/or to at least one of: a predetermined device, a computer, a mobile device, a cell phone, a tablet, and a service tool; and c) providing the plausibility result to a superordinate unit configured to regulate and/or to control a process performed at the application and configured to perform an action of stopping or modifying at least one process step of a process performed at the application and/or at least one other predetermined action when the plausibility result fulfills a condition specified for the respective action.

5. The method according to claim 1, wherein the specified variables include at least one of: at least one process parameter measured by one of the measurement devices of the measurement system, at least one process parameter measured by a measurement instrument installed at the specific application; and at least one diagnostic parameter determined by or for one of the measurement devices.

6. The method according to claim 1, wherein: for at least one of the measurement devices the at least one item of diagnostic information indicative of the condition of the respective measurement device includes at least one of: an age of the measurement device, an operating time the measurement device, service times when the measurement device is serviced, verification times when a measurement accuracy of the measurement device is verified, a verification result attained by a verification of the measurement accuracy of the measurement device, calibration times when the measurement device is calibrated, a calibration result attained by a calibration of the measurement device, at least one diagnosis parameter determined by the measurement device, a status indicator determined based on a self-diagnosis performed by the measurement device, and an exposure-index corresponding to an exposure of the measurement device to adverse measurement conditions.

7. The method according to claim 1, wherein:

a) for at least one measurands the plausibility criteria determined for the respective measurand include at least one of:

a threshold criterium for determining a plausibility value based on whether the current measured value(s) of the respective measurand occur within an application-specific threshold-range not to be exceeded by this measurand, a threshold criterium for determining a plausibility value indicative of the plausibility of at least one current measured value of the respective measurands based on application-specific probabilities of occurrence of measured values of this measurand within application-specific threshold ranges, and a criterium for determining a plausibility value indicative of the plausibility of at least one current measured value of the respective measurand based on at least one current variable value of at least one or of two other variable(s), wherein each other variable is given by one of the other measurands or by a parameter included in the specified variables, and/or wherein:

b) for at least one of the measurands the plausibility measures include at least one of:

a plausibility measure determined based on a method of detecting outliers included in the measured values of the respective measurand;

a plausibility measure determined based on measured values of the respective measurand measured before the time(s) of measurement of the at least one current measured value of the respective measurand, a plausibility measure determined based on a combination of a probability of occurrence of measured values of the size of the at least one current measured value(s) of the respective measurand at the specific application and their probability of occurrence according to an empirical distribution determined based on measured value(s) of the respective measurand measured during a limited time interval preceding the time(s) of measurement of the current measured value(s); and a plausibility measure determined based on a deviation between the at least one current measured value of the respective measurand and corresponding predicted values predicted based on measured values of the respective measurand measured before the time(s) of measurement of the current measured value(s), wherein the predicted values are either determined based on autoregressive integrated moving average model that is fitted to the time series of the previously determined measured values, or determined based on a model for the measured values of the respective measurand that has been determined by a method of machine learning based on the data, or determined by another method of time series prediction.

8. The method according to claim 7, wherein: for each plausibility criterium the corresponding plausibility value is determined based on a lookup-table or plausibility function associated to the respective plausibility criterium that assigns the plausibility values to the current measured values of the respective measurand based on or as a function of at least one property given by or determinable based on at least one of the item values of the item of diagnostic information and/or at least one of the variable values of at least one of the specified variables included in the data.

9. The method according to claim 1, wherein for at least one of the measurands the determined plausibility measures include a plausibility measure determined by:

sorting measured values of the respective measurand measured during a preceding time interval according to their size along a line, subdividing the line into four quartiles, each including a quarter of the measured values, and determining the plausibility measure based on a plausibility function assigning the plausibility measure to current measured value(s) of the respective measurand according to the quartile in which they occur to all current measured value(s) occurring at a position within predetermined first ranges of the line and/or according to a probability of occurrence of measured values of the size of current measured value(s) to all current measured value(s) occurring at a position within predetermined second ranges of the line; wherein the probability of occurrence of measured values of the sizes included in the second ranges is determined based on training data included in the data or based on the measured values that were measured during the preceding time interval.

10. The method according to claim 1, wherein for at least one of the measurands the determined plausibility measures include a plausibility measure determined based on a plausibility function assigning the plausibility measure to the at least one current measured value of the respective measurand as a function of or as or based on a sum, a weighted sum, a product, or a weighted product of a first plausibility determined based on a first plausibility function and a second plausibility determined based on a second plausibility function; wherein:

the first plausibility function assigns the first plausibility to the current measured value(s) according to a probability of occurrence of measured values of the size of the current measured value(s) at the specific application;

the first plausibility function is either determined based on estimates of the likelihood of occurrence of measured values of given sizes at the specific application or based on a frequency of occurrence of measured values of different sizes determined based on measured values that have been measured during a training time interval covering a time span of sufficiently long duration to cover all modes of operation and/or each of the processes performed at the specific application;

the second plausibility function assigns the second plausibility to the at least one current measured value based on their probability of occurrence according to an empirical distribution determined based on measured value(s) measured during a limited time interval preceding the time of measurement of the current measured value(s); and the second plausibility function is either determined as or based on a frequency of occurrence of measured values of different sizes determined based on the measured values that have been measured during the limited time interval or as a probability function representing the probability of occurrence of measured value of the respective measurand as a function of their size determined based on a kernel density estimation.

11. The method according to claim 1, further comprising the steps of for at least one of the measurands:

identifying at least one knock-out criterium for the plausibility of the measured values of the respective measurand; and performing the determination of the total plausibility of the measured values of the respective measurand such, that the total plausibility is either set to zero or reduced to an extent accounting for an impact of the fulfillment of the respective knock-out criterium on the plausibility of the measured values of the respective measurand when the respective knock-out criterium is fulfilled;

wherein the knock-out criteria identified for the respective measurand include at least one of:

a knock-out criterium related to one of the items of diagnostic information identified for the measurement device measuring this measurand, a knock-out criterium requiring for a status indicator determined for the measurement device measuring this measurand to indicate that the measurement device is defect, a knock-out criterium requiring for the measured values of this measurand and/or the variable values of at least one other variable included in the specified variables to exceed a maximum tolerable range or to exceed or drop below a given threshold, and a knock-out criterium related to at least one parameter included in the specified variables that is measured or determined by one of the measurement devices or by a measurement instrument installed at the specific application.

12. The method according to claim 11, wherein the measurement system is an analysis system, wherein the measurement devices measure measurands of a medium flowing through a flow chamber, wherein the specified variables include a flow of the medium flowing through the flow chamber and wherein:

the plausibility criteria include at least one criterium for determining the plausibility value of measured values of one of the measurands based on the measured flow, and/or the total plausibility of the measured values of at least one or each of the at least one measurand is set to zero when the flow through the flow cell drops below an absolute minimum flow rate required to measure the respective measurand.

13. The method according to claim 1, comprising a method step of performing an iterative process of optimizing this method by based on labeled training data obtained by an expert operator evaluating and classifying previously determined total plausibilities performing a method of machine learning configured to optimize the determination of the total plausibilities and/or to optimize at least one of: the application-specific thresholds, the application-specific threshold ranges, the lookup tables and functions employed to determine the plausibility values and the plausibility measures (Rin) employed to determine the total plausibilities.

14. The method according to claim 1, wherein:

the method is a computer implemented method, each plausibility result is determined and provided by computing means configured to determine and to provide the plausibility result based on the recorded data and based on a computer program implemented on the computing means and causing the computing means to perform the determination; and the computing means is included in the measurement system, is included in or connected to a transmitter connected to the measurement devices, is included in a device, an edge device or a superordinate unit located in the vicinity of the measurement system and connected to or communicating with the measurement devices or is embodied in the cloud.

15. A computer program product comprising a computer program and at least one tangible computer readable medium, wherein at least the computer program is stored on the computer readable medium, and wherein the computer program comprises instructions which, when the program is executed by a computer, cause the computer to carry out the method according to claim 1, based on the data provided to the computer.

* * * * *